(12) United States Patent
Miyazaki et al.

(10) Patent No.: US 9,758,880 B2
(45) Date of Patent: Sep. 12, 2017

(54) METHOD AND SYSTEM FOR CONTROLLING WATER CHEMISTRY IN POWER GENERATION PLANT

(75) Inventors: Toyoaki Miyazaki, Ota-ku (JP);
Masato Okamura, Yokohama (JP);
Osamu Shibasaki, Yokohama (JP);
Hajime Hirasawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 897 days.

(21) Appl. No.: 13/255,765

(22) PCT Filed: Mar. 9, 2010

(86) PCT No.: PCT/JP2010/053855
§ 371 (c)(1),
(2), (4) Date: Sep. 9, 2011

(87) PCT Pub. No.: WO2010/104062
PCT Pub. Date: Sep. 16, 2010

(65) Prior Publication Data
US 2011/0318223 A1 Dec. 29, 2011

(30) Foreign Application Priority Data
Mar. 10, 2009 (JP) ................................ 2009-056566

(51) Int. Cl.
*C23F 11/00* (2006.01)
*C23F 11/02* (2006.01)
(Continued)

(52) U.S. Cl.
CPC ............. *C23F 14/02* (2013.01); *C02F 1/727* (2013.01); *C02F 1/78* (2013.01); *C02F 9/00* (2013.01);
(Continued)

(58) Field of Classification Search
None
See application file for complete search history.

(56) References Cited

U.S. PATENT DOCUMENTS 4,419,327 A * 12/1983 Kelly et al. .................... 422/17
4,574,071 A * 3/1986 DeSilva et al. ................ 422/14
(Continued)

FOREIGN PATENT DOCUMENTS

EP 2 395 130 A1 12/2011
JP 57-167935 A 10/1982
(Continued)

OTHER PUBLICATIONS

Full translation of Suzuki et al. (Japanese Patent # 58207378), obtained from STIC via Phoenix Translations.*
(Continued)

*Primary Examiner* — Clare Perrin
(74) *Attorney, Agent, or Firm* — Oblon, McClelland, Maier & Neustadt, L.L.P.

(57) ABSTRACT

A method for controlling water chemistry in a power generation plant including a low-pressure feedwater heater (18), a deaerator (19), and a high-pressure feedwater heater (20) disposed sequentially along a feedwater pipe (16) from a condenser (15) to a steam generator or a boiler (11) to control the chemistry of feedwater guided to the steam generator or the boiler includes the steps of: injecting an oxidant through an oxidant injection line (31) into feedwater flowing through the feedwater pipe disposed downstream of the condenser in such a way that a dissolved oxygen concentration in the feedwater ranges from 3 to 100 ppb while the feedwater is maintained to be neutral to form an oxide film on surfaces of the feedwater pipe, the low-pressure feedwater heater, the deaerator, the high-pressure feedwater heater, and other structural members that come into contact with the feedwater; and injecting a deoxidant
(Continued)

through a deoxidant injection line (35) into the feedwater flowing through the feedwater pipe disposed downstream of the deaerator in such a way that the dissolved oxygen concentration in the feedwater flowing into the steam generator or the boiler lowers to 5 ppb or lower.

8 Claims, 5 Drawing Sheets

(51) Int. Cl.

| | | |
|---|---|---|
| C02F 1/20 | (2006.01) | |
| C02F 1/72 | (2006.01) | |
| C02F 1/02 | (2006.01) | |
| C23F 14/02 | (2006.01) | |
| C02F 1/78 | (2006.01) | |
| C02F 9/00 | (2006.01) | |
| F22D 1/00 | (2006.01) | |
| F22D 11/00 | (2006.01) | |
| F28B 1/02 | (2006.01) | |
| F28B 9/00 | (2006.01) | |
| F28F 19/00 | (2006.01) | |
| F28F 19/01 | (2006.01) | |
| G21D 1/02 | (2006.01) | |
| C02F 1/68 | (2006.01) | |
| B01D 5/00 | (2006.01) | |
| G21C 9/00 | (2006.01) | |
| C02F 1/70 | (2006.01) | |

(52) U.S. Cl.
CPC .............. *F22D 1/003* (2013.01); *F22D 11/00* (2013.01); *F28B 1/02* (2013.01); *F28B 9/00* (2013.01); *F28F 19/00* (2013.01); *F28F 19/01* (2013.01); *G21D 1/02* (2013.01); *C02F 1/02* (2013.01); *C02F 1/20* (2013.01); *C02F 1/70* (2013.01); *C02F 1/722* (2013.01); *C02F 1/725* (2013.01); *C02F 2209/06* (2013.01); *C02F 2209/22* (2013.01); *C02F 2303/08* (2013.01); *Y02E 30/40* (2013.01)

(56) References Cited

U.S. PATENT DOCUMENTS

| | | | | |
|---|---|---|---|---|
| 5,892,805 | A * | 4/1999 | Yamane | G21C 19/307 376/305 |
| 6,391,256 | B1 * | 5/2002 | Moon et al. | 422/14 |
| 6,793,883 | B2 * | 9/2004 | Andresen et al. | 422/7 |

FOREIGN PATENT DOCUMENTS

| | | | | | |
|---|---|---|---|---|---|
| JP | 58207378 | A | * | 12/1983 | ............. C23F 11/18 |
| JP | 6-94209 | A | | 4/1994 | |
| JP | 06094209 | A | * | 4/1994 | ............. F22D 11/00 |
| JP | 6-123798 | A | | 5/1994 | |
| JP | 10-339793 | A | | 12/1998 | |
| JP | 10339793 | A | * | 12/1998 | ............... G21D 1/00 |
| JP | 11 304992 | | | 11/1999 | |
| JP | 11304993 | A | * | 11/1999 | ............... G21D 1/02 |
| JP | 2005 283530 | | | 10/2000 | |
| JP | 2003-315487 | A | | 11/2003 | |
| JP | 2004 108240 | | | 4/2004 | |
| JP | 2005 291815 | | | 10/2005 | |
| JP | 2005291815 | A | * | 10/2005 | ........... G21C 19/307 |
| SU | 516832 | A | | 9/1976 | |

OTHER PUBLICATIONS

Machine translation of Furusawa et al. (Japanese Patent # 06094209), obtained from JPO.*
Machine translation of Kobayashi et al. (Japanese Patent # 11304993), obtained from JPO.*
Machine translation of Wada et al. (Japanese Patent # 2005291815), obtained from JPO.*
Full translation of Suzuki et al. (Japanese Patent # 58207378), obtained Jun. 2014, pp. 1-12.*
Machine translation of Yukio et al. (Japanese Patent # 10339793), pp. 1-23.*
Full translation of Yukio, et al. (Japanese Patent # 10-339793), pp. 1-69.*
Extended European Search Report issued Feb. 27, 2013 in Patent Application No. 10750815.2.
International Preliminary Report on Patentability and Written Opinion issued Oct. 18, 2011 in Patent Application No. PCT/JP2010/053855 filed Mar. 9, 2010.
Office Action and Search Report issued on Jan. 24, 2014 in the corresponding Chinese Patent Application No. 201080011504.3 (with English Translation).
Huang Guolong, et al.; "Oxygenated treatment for feed water of supercritical units", East China Electric Power, vol. 33, No. 8, Aug. 31, 2005, pp. 72-75 (with English Abstract).
Li Yong-sheng, "Application of Water Giving Compound Oxygen Treatment in Japanese Power Plant", Shanxi Electric Power, No. 2, Apr. 30, 2003, pp. 1-6 (with English Abstract).
International Search Report issued Apr. 27, 2010 in PCT/JP10/053855 filed Mar. 9, 2010.
Combined Chinese Office Action and Search Report issued Dec. 4, 2012 in Chinese Patent Application No. 201080011504.3 (with English-language translation).
Fang Sheng, "Feedwater oxygenation treatment technology and its applications", Jiangxi Electric Power, vol. 29, No. 6, Dec. 31, 2005, pp. 24-26.

* cited by examiner

METHOD AND SYSTEM FOR CONTROLLING WATER CHEMISTRY IN POWER GENERATION PLANT

TECHNICAL FIELD

The present invention relates to method and system for controlling water chemistry in a power generation plant, and particularly, to method and system for controlling water chemistry in a power generation plant for preferably suppressing corrosion of a steam generator, a boiler and structural members other than steam generators.

BACKGROUND ART

Purposes of water chemistry (quality) control in a secondary system of a pressurized water reactor (PWR) power generation plant, secondary systems of a thermal power generation plant and a fast-breeder reactor (FBR) power generation plant, and any other power generation plant (hereinafter referred to as a power generation plant) are to suppress corrosion of tubing and equipment, particularly corrosion of a heat transfer tube of a steam generator (SG) or a boiler and to prevent impurities, that lead to alkali corrosion of the heat transfer tube of the steam generator or the boiler, from being introduced therein.

As measures against the corrosion described above, water chemistry is controlled by injecting chemicals into a system to prevent deposition due to elution of ions from metal (such as iron) structural members and corrosion thereof.

For example, in a secondary system of a pressurized water reactor power generation plant, ammonia is injected to keep secondary water alkaline so as to prevent iron from flowing into the steam generator or the boiler, and a magnetite ($Fe_3O_4$) film is formed on the surface of carbon-steel tubing to suppress elution of iron and other substances so that the iron concentration in the tubing system is lowered. Further, corrosion of the heat transfer tube of the steam generator is suppressed by injecting hydrazine to reduce the amount of oxygen in the secondary water (see Patent Document 1). The measures described above are similar to those to the secondary systems of a thermal power generation plant and an FBR power generation plant. Moreover, in a main steam pipe disposed on a downstream side of the steam generator or the boiler and in a pipe through which drain or any other two-phase fluid formed of vapor and water flows, by the transfer of the injected ammonia to a gaseous ammonia, pH in the pipe is hence maintained at a high value, thereby reducing the amount of corrosion.

Further, in the power generation plants described above, as other measures to reduce the amount of corrosion of the carbon steel, there is performed a high AVT (All Volatile Treatment) method in which the pH value is maintained at 9.5 or greater, which is greater than a current value, by injecting ammonia, and also performed a method in which ethanolamine, morpholine, or any other suitable substitute amine is injected instead of ammonia, and effects of lowering impurity concentration have been confirmed.

PRIOR ART DOCUMENTS

Patent Document

Patent Document 1: Japanese Patent Laid-Open Publication No. HEI 11-304992

DISCLOSURE OF THE INVENTION

Problems to be Solved by the Invention

In the high AVT method, however, which requires a significant amount of chemicals, a heavy burden is put on a condensate demineralizer (CD), disadvantageously increasing cost of reproducing or otherwise processing an ion exchange resin used in the condensate demineralizer. On the other hand, ethanolamine is disadvantageously more expensive than ammonia in terms of disposal cost. Further, since hydrazine necessary to suppress corrosion of the heat transfer tube of the steam generator or the boiler leads to high discharge treatment cost, it is required to reduce the amount of hydrazine to be used or develop an alternative chemical.

The present invention has been made in view of the circumstances described above, and an object of the present invention is to provide method and system for controlling water chemistry in a power generation plant to not only reduce waste liquid processing cost but also suppress corrosion of a steam generator, a boiler, and structural members other than steam generators.

Means for Solving the Problems

A method for controlling water chemistry in a power generation plant according to the present invention is a method for controlling water chemistry in a power generation plant including a low-pressure feedwater heater, a deaerator, and a high-pressure feedwater heater disposed sequentially along a pipe from a condenser to a steam generator or a boiler to control the chemistry of water guided to the steam generator or the boiler, the method including: injecting an oxidant into water flowing through a pipe disposed downstream of the condenser in such a way that a dissolved oxygen concentration in the water ranges from 3 to 100 ppb while the water is maintained to be neutral to form an oxide film on surfaces of the pipe, the low-pressure feedwater heater, the deaerator, the high-pressure feedwater heater, and other components that come into contact with the water; and injecting a deoxidant into the water flowing through the pipe disposed downstream of the deaerator in such a way that the dissolved oxygen concentration in the water flowing into the steam generator or the boiler lowers to 5 ppb or lower.

A system for controlling water chemistry in a power generation plant according to the present invention is a system for controlling water chemistry in a power generation plant including a low-pressure feedwater heater, a deaerator, and a high-pressure feedwater heater disposed sequentially along a pipe from a condenser to a steam generator or a boiler to control the chemistry of water guided to the steam generator or the boiler, the system including: an oxidant injector that injects an oxidant into water maintained to be neutral and flowing through a pipe disposed downstream of the condenser to form an oxide film on surfaces of the pipe, the low-pressure feedwater heater, the deaerator, the high-pressure feedwater heater, and other structural members that come into contact with the water; and a deoxidant injector that injects a deoxidant into the water flowing through the pipe disposed downstream of the deaerator.

Effects of the Invention

In the method and the system for controlling water chemistry in a power generation plant according to the present invention, the structural members can be prevented from being corroded by forming an oxide film on the surfaces of a pipe, a high-pressure feedwater heater, a deaerator, a high-pressure feedwater heater, and other structural members that are made of carbon steel and come into contact with water, and the iron concentration is hence lowered in the water flowing into a steam generator or a boiler. Furthermore, a heat transfer tube of the steam generator or the boiler can be prevented from being corroded by lowering the dissolved oxygen concentration in the water flowing into the steam generator or the boiler to 5 ppb or lower. Moreover, since no ammonia, an amine-based compound, or any other similar substance for changing the water to be alkaline is injected into the water, waste liquid treatment cost can be reduced.

MODES FOR CARRYING OUT THE INVENTION

The best mode for carrying out the present invention will be described hereunder with reference to the accompanying drawings. The present invention is, however, not limited to the following embodiments.

First Embodiment (FIGS. 1 to 7)

Figure 1:
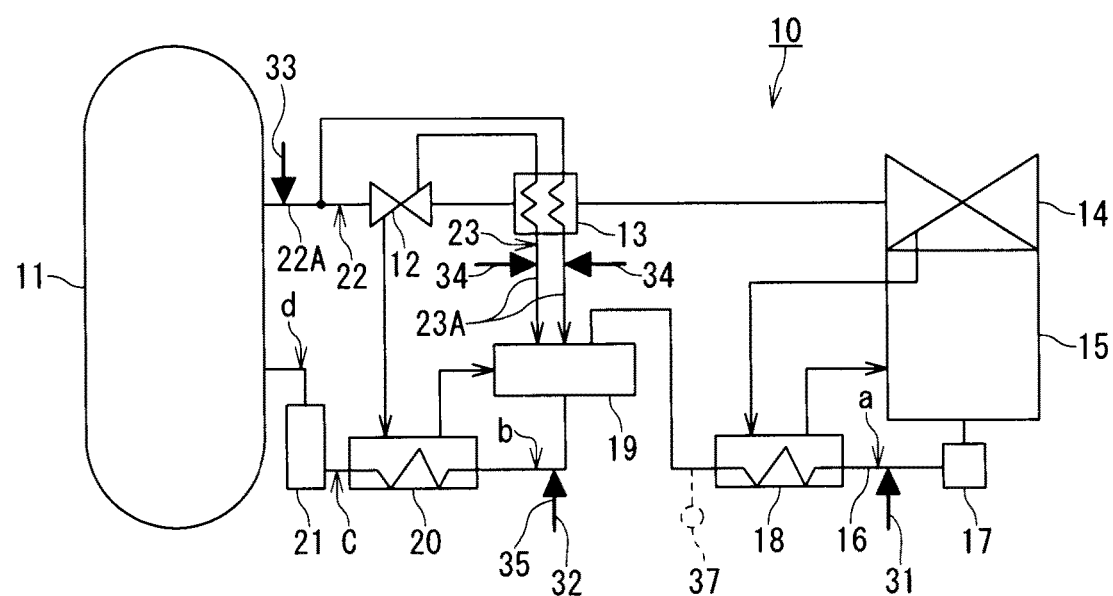
FIG. 1 is a schematic system view showing a power generation plant to which a first embodiment of a method for controlling water chemistry in a power generation plant according to the present invention is applied.

FIG. 1 is a schematic system view of a secondary system of a pressurized water reactor power generation plant and secondary systems of a thermal power plant and an FBR plant to which a first embodiment of a method for controlling water chemistry in a power generation plant according to the present invention is applied.

In a power generation plant 10 shown in FIG. 1, steam generated in a steam generator or a boiler 11 passes through a primary steam pipe (piping or line) 22A of a primary steam system 22. The steam is first introduced into a high-pressure turbine 12, where the steam works, and then introduced into a moisture separator/reheater 13, where moisture of the steam is removed and the resultant steam is reheated. The steam is then introduced into a low-pressure turbine 14, where the steam works. The steam working the job in the low-pressure turbine 14 is condensed in a condenser 15 into condensate. Along a feedwater pipe 16, which is a pipe from the condenser 15 back to the steam generator or the boiler 11, are sequentially disposed a condensate demineralizer 17, a low-pressure feedwater heater 18, a deaerator 19, a high-pressure feedwater heater 20, and a filter apparatus 21. The condensate from the condenser 15 becomes feedwater, which is heated by the low-pressure feedwater heater 18 and the high-pressure feedwater heater 20. The high-temperature feedwater is then guided to the steam generator or the boiler 11.

On the other hand, drain discharged from the moisture separator/reheater 13, which is gas-liquid two-phase fluid formed of vapor and water, is guided to the deaerator 19 through a drain pipe (drain piping or line) 23A of a drain system 23.

Figure 2:
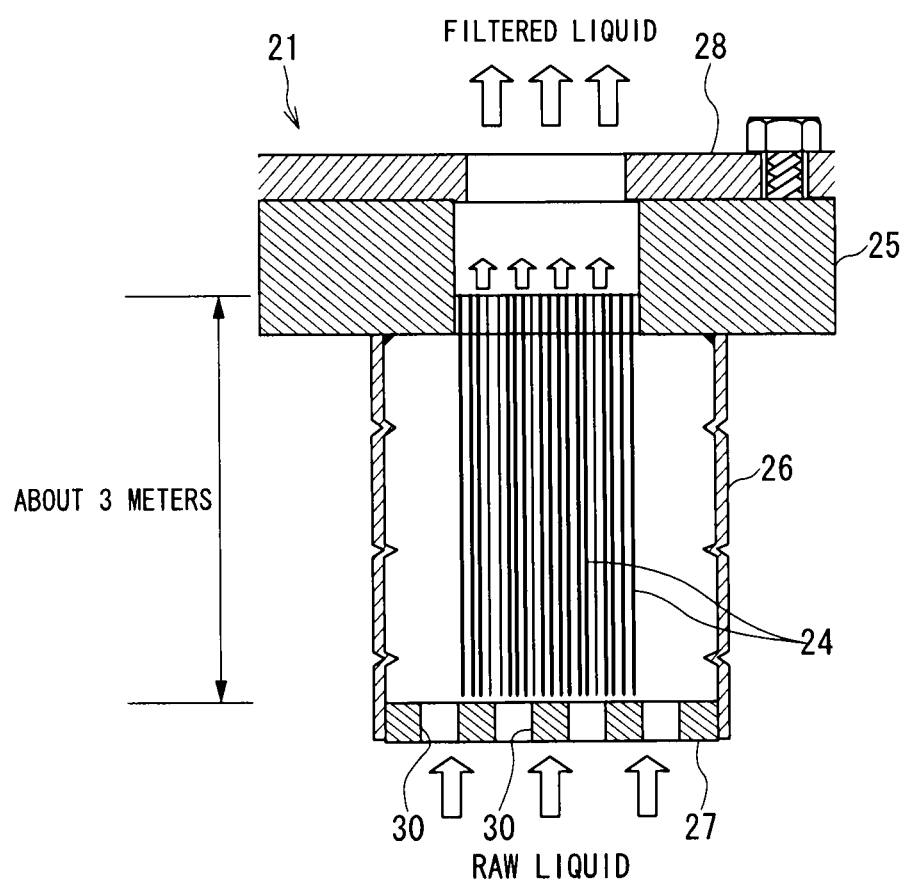
FIG. 2 is a longitudinal sectional view showing a filter apparatus shown in FIG. 1 and including a metal filter, a ceramic filter, a metal sinter filter, or a Teflon-based filter (Teflon is registered Trademark).

The condensate demineralizer 17, which uses an ion exchange resin, and the filter apparatus 21, which uses a metal filter, a ceramic filter, a metal sinter filter, or a Teflon-based filter (hereinafter referred to as a filter) 24 (FIG. 2), remove impurities in the feedwater (or condensate). The filter apparatus 21 is actually formed, for example, of two filter apparatus 21, and filters (about 150 to 250 filters when each filter is a metal filter, a ceramic filter, or a metal sinter filter, about 250 to 1000 filters when each filter is a Teflon-based filter) 24 are provided in each of the two filter apparatus 21, through which the entire amount of raw liquid, which is the feedwater, is filtered, as shown in FIG. 2.

Specifically, each of the filter apparatus 21 includes a pipe plate 25 from which a large number of filters 24 vertically hang, a protective pipe 26 fixed to the pipe plate 25, and a dimple 27 fixed to the lower end of the protective pipe 26. The filters 24 are covered with and protected by the protective pipe 26 and the dimple 27. The pipe plate 25 is supported by a pressure plate 28. The protective pipe 26 has, for example, a diameter of at least 1 m and an axial length of about 3 m. The diameter of each of the filters 24 ranges from about 0.01 to 0.1 m when each filter is a metal filter, a ceramic filter, a metal sinter filter, or a Teflon-based filter, whereas ranging from about 0.0001 to 0.005 m when each filter is a Teflon-based filter.

Figure 3:
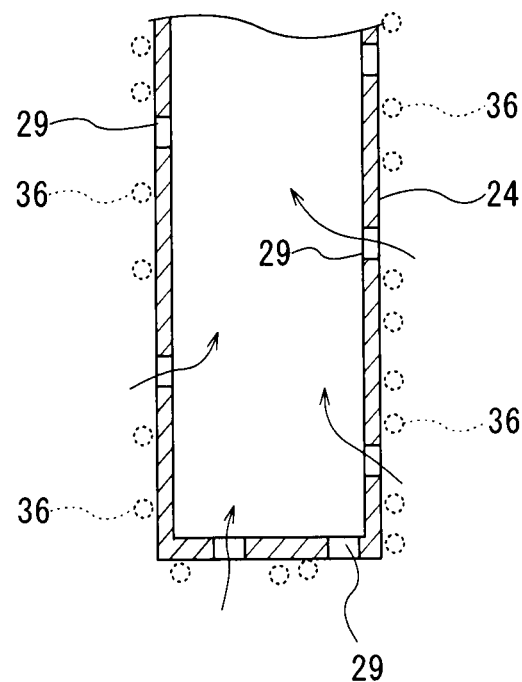
FIG. 3 is a partial sectional view showing a metal filter, a ceramic filter, a metal sinter filter, or a Teflon-based filter shown in FIG. 2.

Each of the filters 24, when it is a metal filter or a metal sinter filter, is made of titanium, stainless steel, or an Ni-base alloy. Each of the filters 24 has a large number of pores 29 each having a diameter of about 1 mm or smaller, as shown in FIG. 3. The raw liquid, which is the feedwater, passes through openings 30 formed through the dimple 27 and is introduced into the protective pipe 26, as indicted by the arrows in FIG. 3, where impurities in the raw liquid are removed while the raw liquid passes through the pores 29 of the filters 24. The raw liquid thus becomes purified feedwater.

In the power generation plant shown in FIG. 1, a heat transfer tube of the steam generator or the boiler 11 is made of an Ni-base alloy or an anti-corrosion carbon steel, and the filters 24 in the filter apparatus 21 are made of titanium, a titanium compound, stainless steel, or an Ni-base alloy when each filter is a metal filter or a metal sinter filter.

Most of the portions other than the heat transfer tube and the filters, particularly, the high-pressure turbine 12, the low-pressure turbine 14, the primary steam pipe 22A, the moisture separator/reheater 13, the condenser 15, the feedwater pipe 16, the low-pressure feedwater heater 18, the deaerator 19, the high-pressure feedwater heater 20, the filter apparatus 21 (except filters 24), and other structural members, are made of carbon steel.

Further, in the power generation plant 10, the feedwater pipe 16 disposed downstream of the condenser 15, the feedwater pipe 16 disposed downstream of the deaerator 19, the main steam pipe 22A disposed upstream of the high-pressure turbine 12, and the drain pipe 23A are provided with oxidant injection lines 31, 32, 33, and 34 as oxidant injectors, respectively. Oxygen (gas), hydrogen peroxide (liquid), or ozone (gas), alone or a mixture thereof, is injected as an oxidant through the oxidant injection lines 31, 32, 33 and 34. In the present embodiment, gaseous oxygen is injected through the oxidant injection lines 31, 32, 33, and 34.

In the present embodiment, instead of injecting ammonia or an amine-based compound into the power generation plant 10 to change the feedwater to be alkaline and forming an oxide film made of magnetite ($Fe_3O_4$) on the surfaces of the carbon-steel structural members, oxygen is injected as an oxidant through the oxidant injection lines 31, 32, 33, and 34 while the feedwater is maintained to be neutral (pH ranging from 5.6 to 8.3).

That is, the oxidant injection line 31 is arranged in a position along the feedwater pipe 16 between the condensate demineralizer 17 and the low-pressure feedwater heater 18, which are disposed downstream of the condenser 15. Oxygen is injected through the oxidant injection line 31 into the feedwater flowing through the feedwater pipe 16 disposed downstream of the condensate demineralizer 17 in such a way that the dissolved oxygen concentration in the feedwater is adjusted to a value ranging from 3 to 100 ppb. A hematite ($Fe_2O_3$) oxide film, which has low solubility in a neutral solution, is formed to a sufficient thickness on the surfaces of the feedwater pipe 16, the low-pressure feedwater heater 18, the deaerator 19, the high-pressure feedwater heater 20, and other structural members that come into contact with the feedwater.

The formation of the oxide film prevents iron and chromium from being eluted from the carbon steel material with which the feedwater pipe 16 and other structural members are made, whereby the iron concentration in the feedwater flowing into the steam generator or the boiler 11 is lowered to 1 ppb or less.

Figure 4:
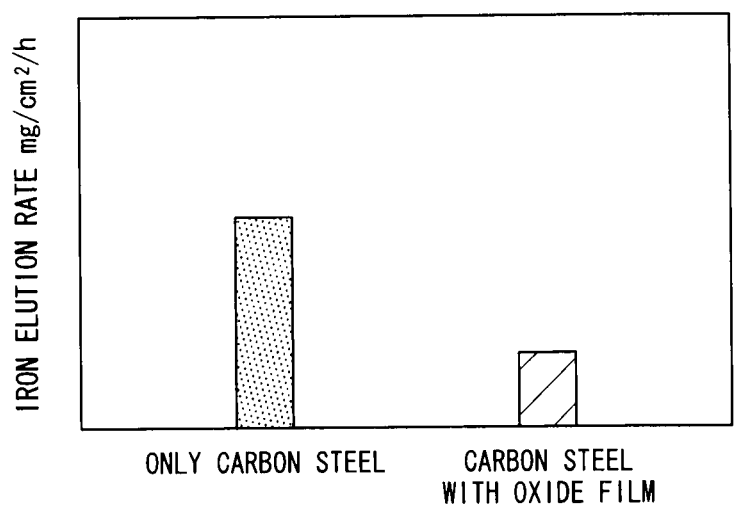
FIG. 4 is a graph representing results of an experiment of preventing iron from being eluted from a test piece made of carbon steel with an oxide film formed thereon and a test piece made only of carbon steel.

The effect of the oxide film made of hematite ($Fe_2O_3$) described above on preventing elements of the carbon steel (iron, for example) from being eluted was studied by conducting an experiment, and FIG. 4 describes results of the experiment.

In the present experiment, to produce a hematite ($Fe_2O_3$) oxide film on the surface of carbon steel, a test piece was prepared by exposing the carbon steel in hot water (ranging from 40 to 180° C., for example) having a dissolved oxygen concentration of 200 ppb for 500 hours. The test piece and a test piece made only of carbon steel were used to carry out an iron elution test. The test was so carried out that both test pieces were immersed in a neutral aqueous solution having a dissolved oxygen concentration lower than 5 ppb and a pH value ranging from 5.6 to 8.3. Iron elution was observed with respect to the test piece made only of carbon steel but having no oxide film formed thereon, and the color of the solution changed accordingly.

On the other hand, no change in the surface state was observed with respect to the test piece with the oxide film formed on the carbon steel, and the color of the solution scarcely changed. As described above, when a stable hematite ($Fe_2O_3$) film is present, iron will not be eluted and the amount of iron introduced into the steam generator or the boiler 11 is reduced.

Figure 5:
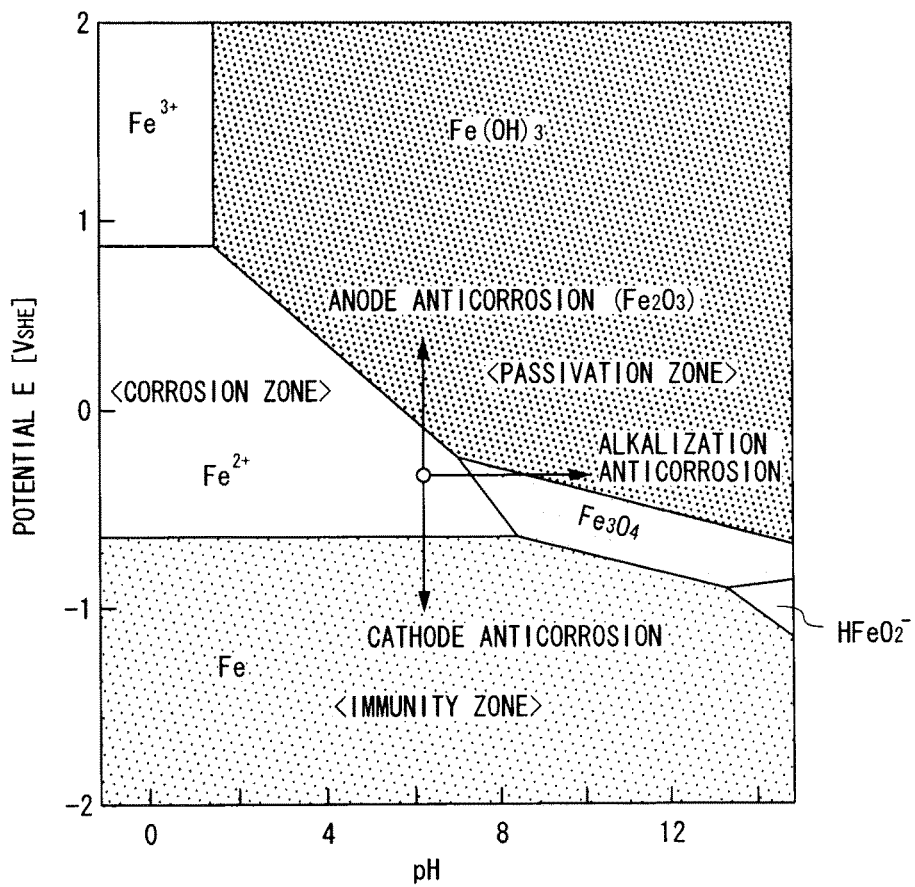
FIG. 5 is a graph representing the relationship between corrosion potential and pH in an Fe—$H_2O$-based material.

Now, the hematite ($Fe_2O_3$) film will be described with reference to FIG. 5. When the feedwater is alkaline, a magnetite ($Fe_3O_4$) film is formed on the surface of the carbon-steel and corrosion of the carbon steel is suppressed (alkalization anticorrosion), as described above. In contrast, when the feedwater is maintained to be neutral and an oxidant (oxygen, for example) is injected, the corrosion potential of carbon steel increases to a value higher than 0 V, and a hematite ($Fe_2O_3$) film is formed on the surface of the carbon steel, thus suppressing corrosion of the carbon steel (anode anticorrosion).

The oxidant injection line 32 shown in FIG. 1 is provided in a position downstream of the deaerator 19 but upstream of the high-pressure feedwater heater 20 along the feedwater pipe 16. Oxygen is also injected through the oxidant injection line 32 into the feedwater flowing through the feedwater pipe 16 in such a way that the dissolved oxygen concentration in the feedwater is adjusted to a value ranging from 3 to 100 ppb. It is noted that the temperature of the feedwater ranges from about 40 to 180° C. in the region from the condenser 15 to the low-pressure feedwater heater 18, whereas the temperature thereof ranges from about 180 to 230° C. in the region from the deaerator 19 to the high-pressure feedwater heater 20.

The oxygen injected through the oxidant injection line 32 therefore causes at least about 80% of metal ions (iron ion, in particular) dissolved in the high-temperature feedwater to be cladded and deposited. The clad suspended in the feedwater is removed through the metal filters, the ceramic filters, the metal sinter filters, or the Teflon-based filters 24 in the filter apparatus 21 disposed upstream of the steam generator or the boiler 11, whereby the amount of iron introduced into the steam generator or the boiler 11 is reduced.

The oxidant injection line 33 is provided in a position upstream of the high-pressure turbine 12 along the primary steam pipe 22A of the primary steam system 22, and the oxidant injection line 34 is provided in a position along the drain pipe 23A of the drain system 23. Both oxidant injection lines 33 and 34 are not necessarily provided but either of them may be provided. Oxygen is injected as an oxidant through the oxidant injection lines 33 and 34 at an injection rate ranging from 0.01 to 100 kg/hr. This injection rate is necessary to ensure a predetermined dissolved concentration (3 to 100 ppb) in consideration of the speed of the steam flowing through the primary steam pipe 22A and the flow rate of the gas-liquid two-phase drain flowing through the drain pipe 23A.

Through the injection of the oxygen into the primary steam system 22 and the drain system 23 as described above, a hematite ($Fe_2O_3$) film can be formed on the surfaces of the primary steam pipe 22A, the high-pressure turbine 12, the moisture separator/reheater 13, the low-pressure turbine 14, the drain pipe 23A, and other components, thus suppressing corrosion of the pipes and the components described above.

In the power generation plant 10, a deoxidant injection line 35 is further provided as a deoxidant injector for injecting a deoxidant into the feedwater flowing through the feedwater pipe 16 disposed downstream of the deaerator 19 but upstream of the high-pressure feedwater heater 20. The deoxidant is preferably hydrazine or hydrogen.

The deoxidant (hydrazine or hydrogen) injected into the feedwater reacts with oxygen over the surface of a heat transfer tube of the high-pressure feedwater heater 20, the surface (inner surface) of the feedwater pipe 16, and the surfaces of the filters 24 in the filter apparatus 21, whereby the dissolved oxygen concentration in the feedwater flowing into the steam generator or the boiler 11 is lowered to 5 ppb or lower, resulting in the lowering of the corrosion potential of the heat transfer tube of the steam generator or the boiler 11. Since the heat transfer tube of the steam generator or the boiler 11 is made of an Ni-base alloy or an anticorrosion carbon steel, increase in the corrosion potential promotes corrosion, whereas decrease in the corrosion potential suppresses corrosion. In view of this fact, corrosion of the heat transfer tube of the steam generator or the boiler 11 is suppressed by lowering the corrosion potential of the heat transfer tube, as described above.

Figure 6:
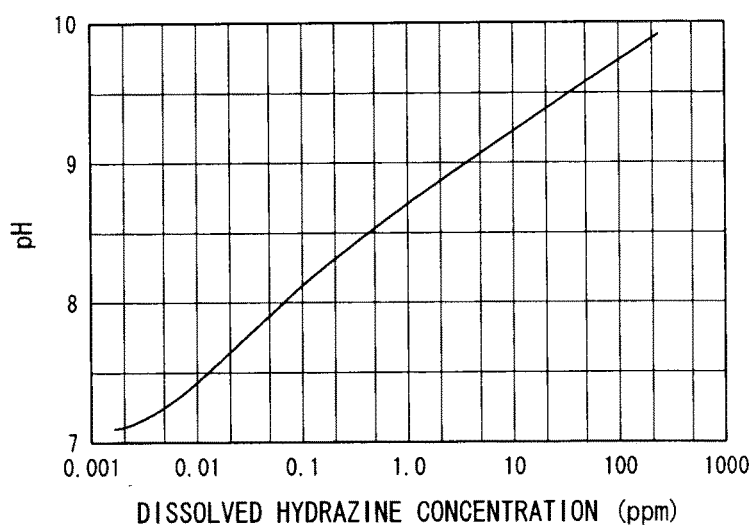
FIG. 6 is a graph representing the relationship between a dissolved hydrazine concentration and pH.

The amount of injected hydrazine is so adjusted that the dissolved hydrazine concentration in the feedwater ranges from 3 to 100 ppb for the purpose of maintaining the feedwater to be neutral (pH ranging from 7.0 to 8.3) by using the smallest amount of hydrazine that can consume all the injected oxygen in consideration that hydrazine reacts with oxygen in an equimolar reaction. The hydrazine is thermally decomposed into ammonia and tends to change the feedwater to be alkaline, as shown in FIG. 6. However, when the dissolved hydrazine concentration is not higher than about 100 ppb, pH of the feedwater can be maintained at 8.3 or lower or to be substantially neutral, whereby no heavy burden will be put on the condensate demineralizer 17.

Figure 7:
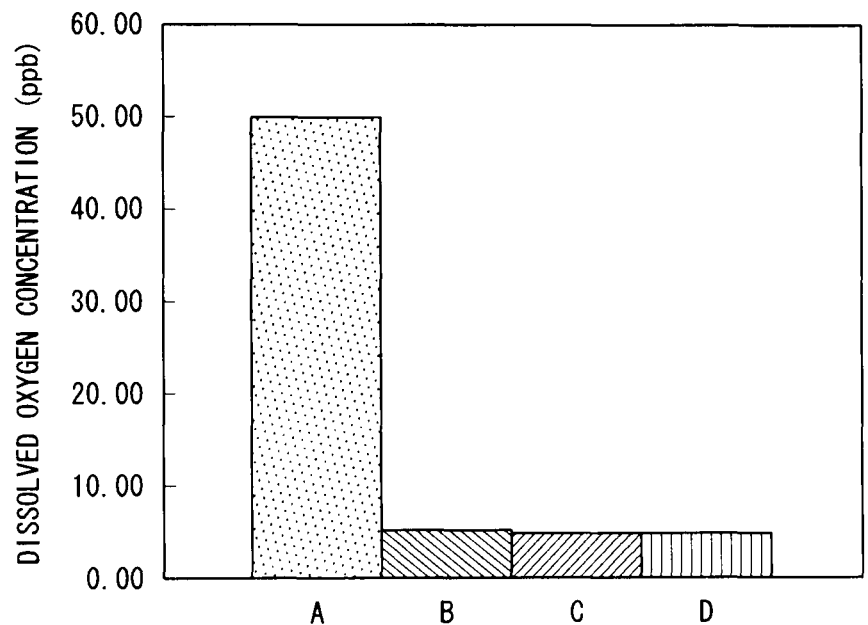
FIG. 7 is a graph representing results of an evaluation of dissolved oxygen concentration resulting from a reaction between hydrazine and oxygen in several positions along a feedwater pipe.

FIG. 7 is a graph representing results of an evaluation of the dissolved oxygen concentration resulting from a reaction between the hydrazine and the oxygen in the feedwater pipe 16 made of carbon steel.

The evaluation was made under conditions, in which the length of the feedwater pipe 16 from the point where the oxidant injection line 31 is connected to the feedwater pipe 16 to the point where the feedwater pipe 16 is connected to the high-pressure feedwater heater 20 was 100 m, the flow rate of the feedwater flowing through the feedwater pipe 16 was 2.24 m/s, and the number of high-pressure feedwater heaters 20 was two.

The symbol A in FIG. 7 represents the dissolved oxygen concentration at a position "a" (FIG. 1) immediately downstream of the point where oxygen is injected into the feedwater pipe 16 through the oxidant injection line 31. The symbol B represents the dissolved oxygen concentration at a position "b" where the feedwater pipe 16 is connected to an upstream portion of the high-pressure feedwater heater 20. Further, the symbols C and D represent the dissolved oxygen concentrations in a position "c" along the feedwater pipe 16 immediately after the feedwater passes through the high-pressure feedwater heater 20 and in a position "d" along the feedwater pipe 16 immediately after the feedwater passes through the filter apparatus 21, respectively.

That is, when the highest dissolved oxygen concentration at the time of injecting the oxygen through the oxidant injection line 31 is, for example, 50 ppb, and hydrazine is injected through the deoxidant injection line 35 such that the dissolved hydrazine concentration in the feedwater is about 50 ppb, the dissolved oxygen concentrations in the positions "b", "c" and "d" are lowered to about 5 ppb. Further, when the hydrazine is injected through the deoxidant injection line 35 under the same dissolved oxygen concentration condition in such a way that the dissolved hydrazine concentration in the feedwater is about 100 ppb, the dissolved oxygen concentrations in the positions "b", "c" and "d" are lowered to 0.5 ppb or lower. The evaluation indicates that injecting hydrazine lowers the dissolved oxygen concentration in the feedwater flowing into the steam generator or the boiler 11 to 5 ppb or lower.

Hydrogen may alternatively be injected as a deoxidant through the deoxidant injection line 35, and the amount of injected hydrogen is so adjusted that the dissolved hydrogen concentration in the feedwater ranges from 100 to 40000 ppb. This amount of injected hydrogen is required to consume the injected oxygen but does not allow the hydrogen to transfer into the primary steam system 22 or is small enough even if the hydrogen transfer into the primary steam system 22. The injected hydrogen also reacts with the oxygen over the surface of the heat transfer tube of the high-pressure feedwater heater 20, the surface (inner surface) of the feedwater pipe 16, and the surfaces of the filters 24 in the filter apparatus 21. Accordingly, the dissolved oxygen concentration in the feedwater flowing into the steam generator or the boiler 11 is lowered and hence the corrosion potential of the heat transfer tube of the steam generator or the boiler 11 is lowered. The corrosion of the heat transfer tube is thus suppressed.

The present embodiment of the structures and characters mentioned above provides the following advantageous effects (1) to (3).

(1) An oxidant is injected through the oxidant injection line 31 into the feedwater flowing through the feedwater pipe 16, through the oxidant injection line 33 into the primary steam in the primary steam pipe 22A, and through the oxidant injection line 34 into the drain in the drain pipe 23A in such a way that the dissolved oxygen concentration in the feedwater ranges from 3 to 100 ppb while the feedwater flowing through the feedwater pipe 16 is maintained to be neutral. In this way, an oxide film can be formed on the surfaces of the feedwater pipe 16, the low-pressure feedwater heater 18, the deaerator 19, the high-pressure feedwater heater 20, the high-pressure turbine 12, the low-pressure turbine 14, the moisture separator/reheater 13, the primary steam pipe 22A, the condenser 15, the drain pipe 23A, and other structural members, which are all made of carbon steel. The formation of the oxide film can suppress corrosion of the structural members described above.

In this way, the iron concentration in the feedwater particularly flowing through the feedwater pipe 16 into the steam generator or the boiler 11 can be lowered to 1 ppb or lower. Further, the oxidant injected into the feedwater through the oxidant injection line 32 causes the iron ion in the feedwater to be cladded, and the resultant clad is removed through the filter apparatus 21, whereby the amount of iron flowing into the steam generator or the boiler 11 is reduced. Deposition of the clad in the steam generator or the boiler 11 and intergranular attack (IGA) in the heat transfer tube of the steam generator or the boiler 11 can therefore be suppressed. As a result, the necessary number of cleaning and damage repairing operations performed on the inner surface of the steam generator or the boiler 11 against the unwanted phenomena described above can be reduced, resulting in reduction of operation and maintenance costs.

(2) Since the deoxidant injected through the deoxidant injection line 35 lowers the dissolved oxygen concentration in the feedwater flowing into the steam generator or the boiler 11 to 5 ppb or lower, the corrosion potential of the heat transfer tube of the steam generator or the boiler 11 made of an Ni-base alloy lowers to thereby suppress the corrosion of the heat transfer tube.

(3) Since no ammonia, an amine-based compound, or any other similar substance for maintaining the feedwater alkaline is injected into the feedwater, no heavy burden is put on the condensate demineralizer 17. Furthermore, since injecting hydrazine also maintains the feedwater to be neutral, the burden put on the condensate demineralizer 17 can further be reduced, and in this case, waste liquid treatment cost can be also reduced.

Second Embodiment (FIGS. 1 and 3)

Hereunder, in the description of a second embodiment, portions similar to those in the first embodiment described above have the same reference characters, and duplicated descriptions of these portions will be simplified or omitted.

The second embodiment differs from the first embodiment described above in that a film made of a noble metal including platinum is formed on the surface of the heat transfer tube of the high-pressure feedwater heater 20 and the surfaces of the filters 24 in the filter apparatus 21, and the noble metal promotes the reaction between the deoxidant (hydrazine or hydrogen) and the oxygen.

FIG. 3 shows platinum powder 36 attached to and coated on the surface of each filter 24 in the filter apparatus 21.

The present embodiment not only provides the advantageous effects (1) to (3) provided in the first embodiment described above but also the following additional advantageous effect (4):

(4) Since platinum or any other suitable noble metal functions as a catalyst that promotes the reaction between the deoxidant and the oxygen, the reaction therebetween can progress quickly, thereby reliably lowering the dissolved oxygen concentration in the feedwater flowing into the steam generator or the boiler 11 preferably to 5 ppb or lower.

Figure 8:
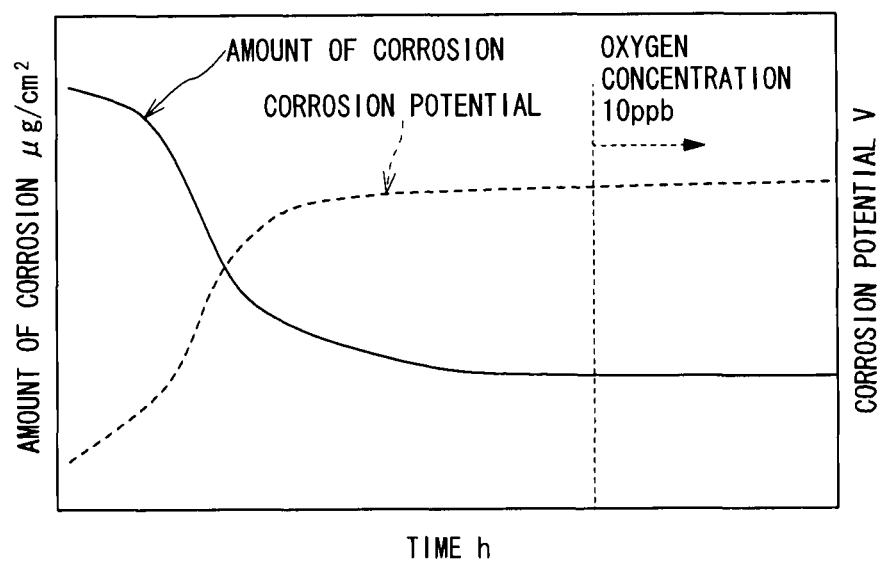
FIG. 8 is a graph representing the relationship between the amount of corrosion and the corrosion potential in a third embodiment of the method for controlling water chemistry in a power generation plant according to the present invention.

Third Embodiment (FIGS. 1 and 8)

FIG. 8 shows a graph illustrating the relationship between the amount of corrosion and the corrosion potential in a third embodiment of the method for operating a secondary system of a pressurized water reactor (PWR) power generation plant, secondary systems of a thermal power generation plant and a fast-breeder reactor (FBR) power generation plant, or other power generation plants according to the present invention. In the third embodiment, portions similar to those in the first embodiment described above are added with the same reference numerals, and duplicated descriptions of the similar portions will be simplified or omitted herein.

The third embodiment differs from the first embodiment in that the corrosion potentials of the surface of the feedwater pipe 16 that comes into contact with the feedwater, the surface of the primary steam pipe 22A that comes into contact with the primary steam, the surface of the drain pipe 23A that comes into contact with the drain, and the surfaces of other structural members are monitored and the amounts of oxygen or any other oxidant injected into the feedwater through the oxidant injection line 31, into the main steam through the oxidant injection line 33, and into the drain through the oxidant injection line 34 are controlled. A description will be made of a representative example in which the corrosion potential of the surface of the feedwater pipe 16 that comes into contact with the feedwater is monitored and an oxidant is injected into the feedwater through the oxidant injection line 31 based on the result of the monitoring operation.

FIG. 8 shows results obtained by carrying out an elution test in which a carbon steel test piece is immersed in an aqueous solution having a dissolved oxygen concentration of 50 ppb and a temperature of 150° C., specifically the relationship between the amount of corrosion (the amount of eluted iron) and the corrosion potential of the surface of the test piece. The corrosion potential is initially low but increases after an oxide film is formed. On the other hand, the amount of corrosion is initially large but gradually decreases as the corrosion potential increases because the corrosion potential increases after the oxide film is formed.

In the power generation plant 10 shown in FIG. 1, by the injection of the oxygen or any other suitable oxidant through the oxidant injection line 31, an oxide film can be formed on the surfaces of the structural members that come into contact with the feedwater, and the change in the corrosion potential of the surfaces of the structural members (feedwater pipe 16, for example) is measured and monitored with a corrosion potential meter 37. When the corrosion potential sufficiently increases, an oxide film is formed to a necessary thickness on the surfaces of the structural members. As a result, even when the dissolved oxygen concentration in the feedwater lowers (lowers 50 ppb to 10 ppb in FIG. 8, for example), the amount of corrosion of the structural members does not change. In view of this fact, when the corrosion potential of the surfaces of the structural members (feedwater pipe 16, for example) measured with the corrosion potential meter 37 sufficiently increases, the amount of oxidant (oxygen, for example) injected through the oxidant injection line 31 is reduced to an appropriate value or zero.

Accordingly, the present embodiment not only provides the advantageous effects (1) to (3) provided in the first embodiment but also provides the following advantageous effect (5).

(5) The amount of oxidant to be used can be reduced and operation cost can be also reduced accordingly by monitoring the corrosion potential of the surfaces of the feedwater pipe 16, the primary steam pipe 22A, the drain pipe 23A, and other structural members, and by controlling the amount of oxidant injected into the feedwater, the primary steam, and the drain.

The invention claimed is:

1. A method for controlling water chemistry in a power generation plant including a low-pressure feedwater heater, a deaerator, and a high-pressure feedwater heater disposed sequentially along a carbon steel pipe from a condenser to a steam generator or a boiler made of a Ni-based alloy to thereby control the chemistry of water guided to the steam generator or the boiler, the method comprising: injecting an oxidant gas of oxygen or ozone into water flowing through the carbon steel pipe downstream of the condenser and upstream of the low-pressure feedwater heater; injecting an oxidant gas of oxygen or ozone at an injection rate ranging from 0.01 to 100 kg/hr into the carbon steel pipe of a primary steam pipe and a drain pipe of a main steam system in such a way that the oxidant gas mixes with steam in the main steam system and a dissolved oxygen concentration in the water guided to the steam generator or the boiler ranges from 5 to 100 ppb while the water is maintained to be neutral; thereby forming an iron oxide film on carbon steel surfaces that come into contact with the water; and injecting a deoxidant into the oxidant-injected water flowing through the carbon steel pipe-disposed between the deaerator and the high-pressure feedwater heater in such a way that the dissolved oxygen concentration in the water prior to flowing into the steam generator or the boiler made of the Ni-based alloy lowers to 5 ppb or lower, in which the deoxidant is hydrazine injected so that a dissolved hydrazine concentration in the water flowing through the carbon steel pipe ranges from 3 to 100 ppb or hydrogen injected so that a dissolved hydrogen concentration in the water flowing through the carbon steel pipe ranges from 10 to 40000 ppb.

2. The method for controlling water chemistry in a power generation plant according to claim 1, wherein before injecting the oxidant gas, a corrosion potential of the structural member that comes into contact with the water is monitored to thereby control the amount of the oxidant gas injected into the water.

3. The method for controlling water chemistry in a power generation plant according to claim 1, wherein an oxidant is injected into the water flowing through the pipe disposed downstream of the deaerator in such a way that the dissolved oxygen concentration in the water ranges from 3 to 100 ppb so as to clad iron ions in the water, and the clad is removed through a filter disposed upstream of the steam generator or the boiler.

4. The method for controlling water chemistry in a power generation plant according to claim 1, wherein the deoxidant injected into the water reacts with oxygen on the surface of a heat transfer tube of the high-pressure feedwater heater, the surface of the pipe, and the surface of a filter disposed downstream of the high-pressure feedwater heater but upstream of the steam generator or the boiler so as to lower the dissolved oxygen concentration in the water flowing into the steam generator or the boiler to 5 ppb or lower.

5. The method for controlling water chemistry in a power generation plant according to claim 1, wherein a reaction between the deoxidant and the oxygen is promoted by using a noble metal including platinum formed on the surface of a heat transfer tube of the high-pressure feedwater heater or the surface of a filter.

6. A method for controlling water chemistry in a power generation plant including a low-pressure feedwater heater, a deaerator, and a high-pressure feedwater heater disposed sequentially along a carbon steel pipe from a condenser to a steam generator or a boiler made of a Ni-based alloy to thereby control the chemistry of water guided to the steam generator or the boiler, the method comprising: injecting an oxidant gas of oxygen or ozone into water flowing through the carbon steel pipe downstream of the condenser and upstream of the low-pressure feedwater heater; injecting an oxidant gas of oxygen or ozone at an injection rate ranging from 0.01 to 100 kg/hr into the carbon steel pipe of a primary steam pipe and a drain pipe of a drain system that guides to a deaerator drain discharged from a moisture separator/reheater that separates moisture in the steam and reheats the steam in such a way that the oxidant gas mixes with steam in the drain system and a dissolved oxygen concentration in the water guided to the steam generator or the boiler ranges from 5 to 100 ppb; and injecting a deoxidant into the oxidant-injected water flowing through the carbon steel pipe disposed between the deaerator and the high-pressure feedwater heater in such a way that the dissolved oxygen concentration in the water prior to flowing into the steam generator or the boiler made of a Ni-based alloy lowers to 5 ppb or lower, in which the deoxidant is hydrazine injected so that a dissolved hydrazine concentration in the water flowing through the carbon steel pipe ranges from 3 to 100 ppb or hydrogen injected so that a dissolved hydrogen concentration in the water flowing through the carbon steel pipe ranges from 10 to 40000 ppb.

7. A system for controlling water chemistry in a power generation plant including a low-pressure feedwater heater, a deaerator, and a high-pressure feedwater heater disposed sequentially along a carbon steel pipe from a condenser to a steam generator or a boiler made of a Ni-based alloy to thereby to control the chemistry of water guided to the steam generator or the boiler, the system comprising:
an oxidant injector that injects an oxidant gas of oxygen or ozone at an injection rate ranging from 0.01 to 100 kg/hr into the carbon steel pipe of a primary steam pipe and a drain pipe of a main steam system in such a way that the oxidant gas mixes with steam in the main steam system or the drain system, wherein an iron oxide film forms on carbon steel surfaces that come into contact with the water; and
a deoxidant injector comprising a hydrazine or hydrogen source that injects a deoxidant into the oxidant-injected water prior to flowing through the carbon steel pipe disposed between the deaerator and the high-pressure feedwater heater in such a way that the dissolved oxygen concentration in the water flowing into the steam generator or the boiler made of the Ni-based alloy lowers to 5 ppb or lower, in which the deoxidant is hydrazine injected so that a dissolved hydrazine concentration in the water flowing through the carbon steel pipe ranges from 3 to 100 ppb or hydrogen injected so that a dissolved hydrogen concentration in the water flowing through the carbon steel pipe ranges from 10 to 40000 ppb.

8. The system for controlling water chemistry in a power generation plant according to claim 7, wherein a noble metal including platinum that promotes a reaction between the deoxidant and the oxygen is coated on the surface of a heat transfer tube of the high-pressure feedwater heater or a surface of a filter disposed downstream of the high-pressure feedwater heater but upstream of the steam generator or the boiler.

* * * * *